US005630688A

United States Patent [19]
Tran

[11] Patent Number: 5,630,688
[45] Date of Patent: May 20, 1997

[54] SELF-TAPPING SLEEVE

[75] Inventor: Michael T. Tran, Oakland, Calif.

[73] Assignee: Peerless Lighting Corporation, Berkeley, Calif.

[21] Appl. No.: 397,631

[22] Filed: Feb. 28, 1995

[51] Int. Cl.$^6$ .................................................. F16B 25/00
[52] U.S. Cl. ............................. 411/387; 411/31; 411/395
[58] Field of Search ................................ 411/387, 386, 411/411, 403, 402, 424, 395, 31

[56] References Cited

U.S. PATENT DOCUMENTS

| 2,993,950 | 7/1961 | Forman | 411/387 |
|---|---|---|---|
| 4,862,664 | 9/1989 | Romine | 411/387 |
| 5,102,276 | 4/1992 | Gourd | 411/395 |
| 5,156,616 | 10/1992 | Meadows et al. | 411/395 |
| 5,234,299 | 8/1993 | Giannuzzi | 411/387 |
| 5,308,203 | 5/1994 | McSherry et al. | 411/387 |

FOREIGN PATENT DOCUMENTS 231155  6/1925  United Kingdom .................. 411/387

*Primary Examiner*—Steven N. Meyers
*Assistant Examiner*—Tuyet-Phuong Pham
*Attorney, Agent, or Firm*—Donald L. Beeson

[57] ABSTRACT

A self-tapping sleeve for providing a ceiling junction for a suspended lighting fixture has a cylindrical body, a center passageway for containing the junction, a thread structure on the perimeter surface of the cylindrical body, and two perimeter cutting elements at the top end of the cylindrical body for producing a circular cutting action in front of the sleeve when the sleeve is rotated in and advance rotation. A trim ring is additionally provided at the bottom end of the body to trim out the ceiling junction when the sleeve is installed. A key-shaped portion of the center passageway receives the key-shaped end of a drive tool used to install the sleeve.

12 Claims, 3 Drawing Sheets

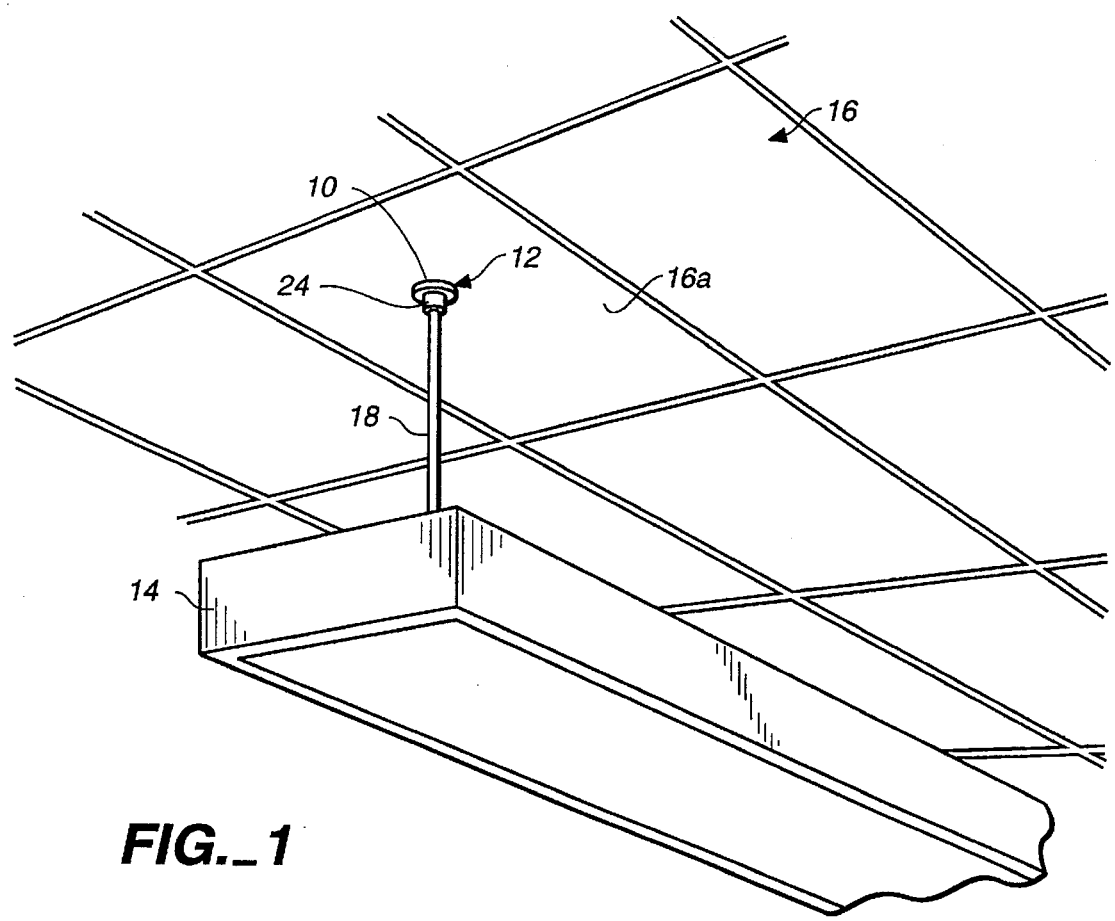
FIG._1
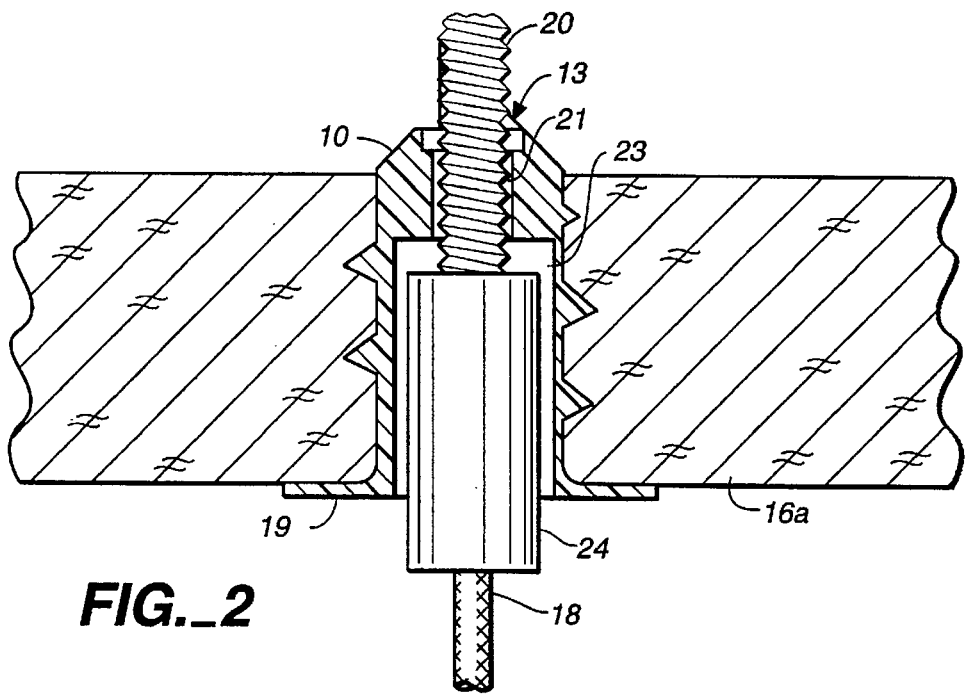
FIG._2

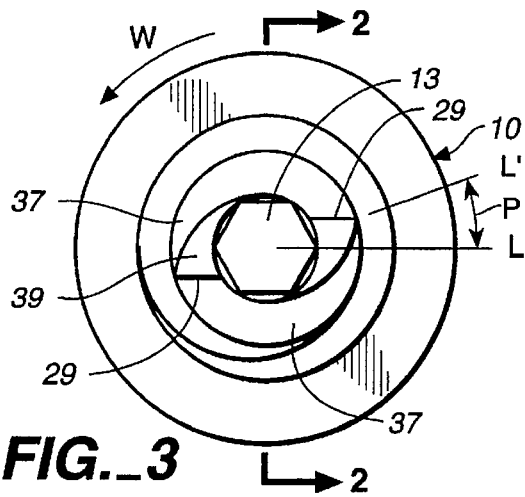
FIG._3
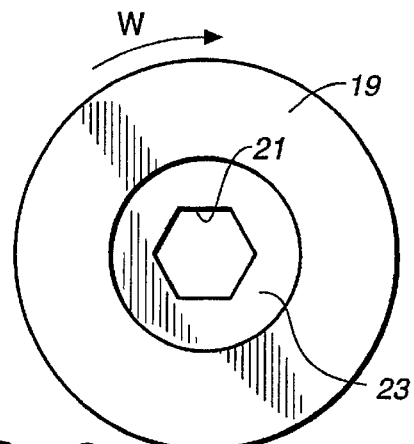
FIG._6
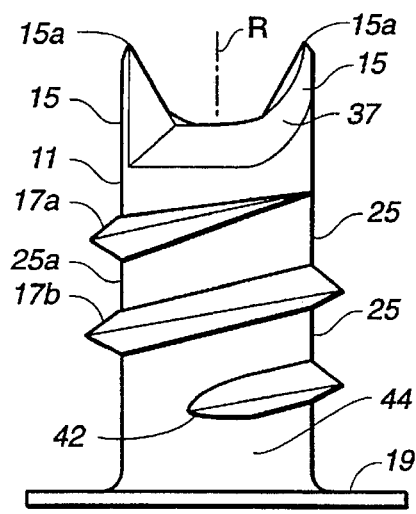
FIG._4
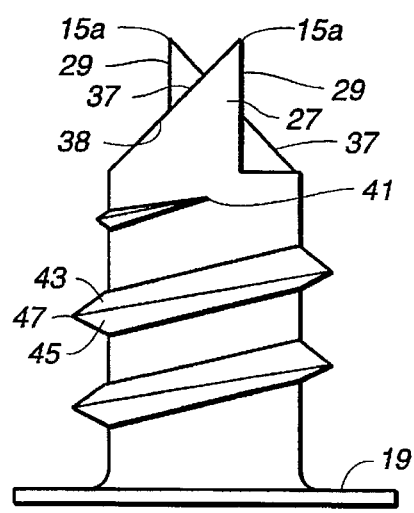
FIG._7
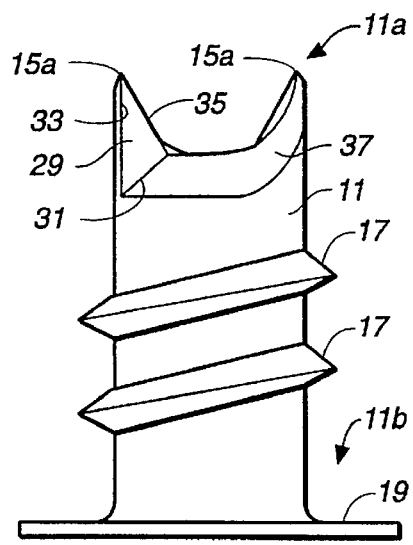
FIG._5

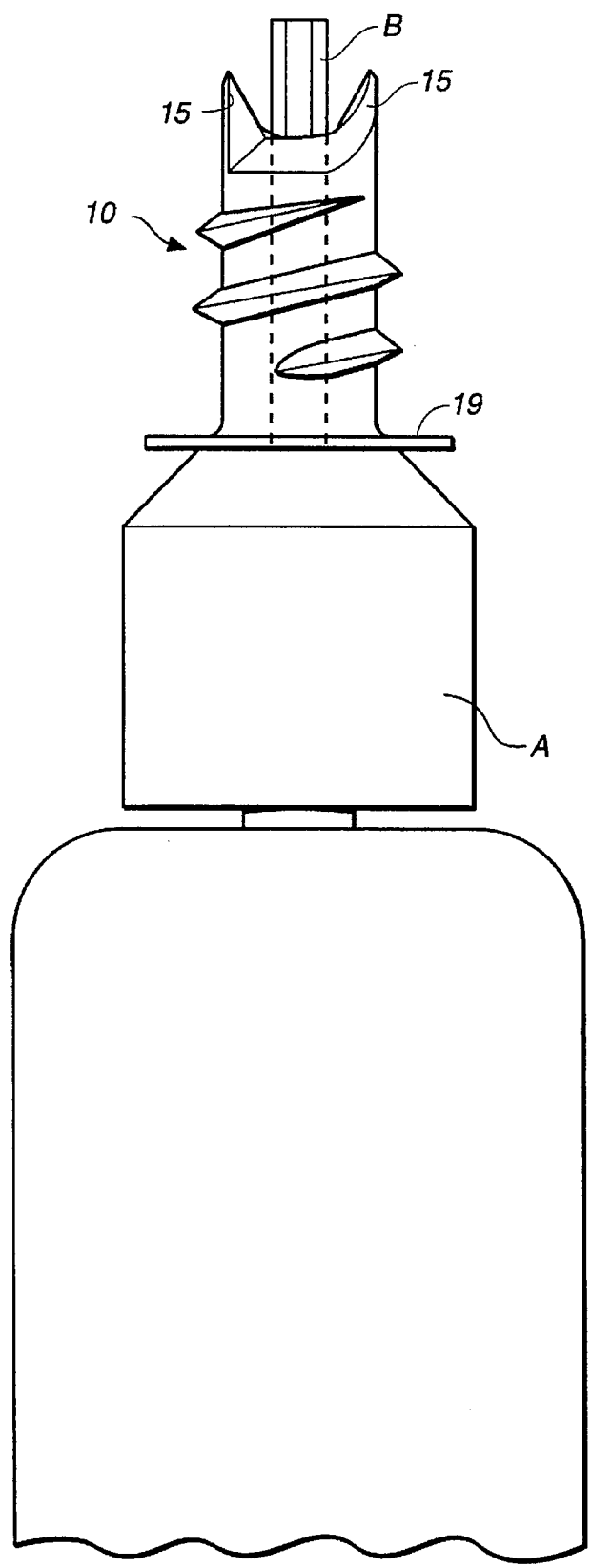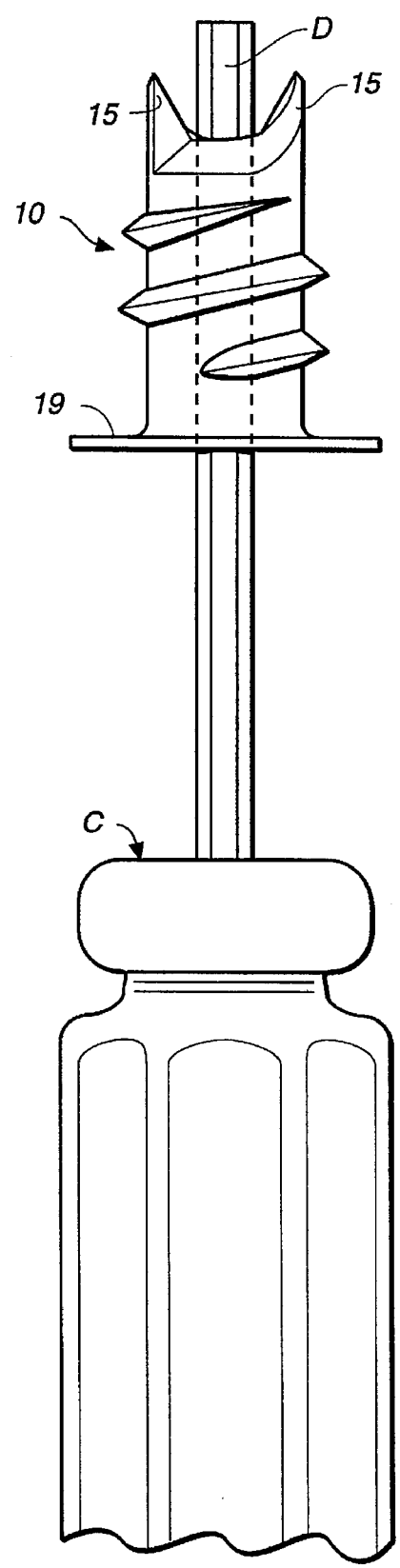
FIG._8  FIG._9

SELF-TAPPING SLEEVE

BACKGROUND OF THE INVENTION

The present invention relates to architectural lighting fixtures and more particularly to hardware for suspending architectural lighting fixtures below a "drop ceiling" such as an acoustical tile grid ceiling or a drywall ceiling.

Architectural lighting fixtures installed in commercial buildings typically must be suspended below a drop ceiling structure which provides a finished ceiling but which itself cannot bear the weight of the lighting fixtures. In such environments, the lighting fixtures must be suspended from the structural components of the building above the drop ceiling. This necessitates drilling a hole through the finished ceiling through which the suspension hardware for the lighting fixture can be installed. For example, when installing a linear lighting system, the fixture components making up the system are typically suspended from a number of different suspension points by means of suspension cables connected at the finished ceiling to 1/4-20 threaded support rods. The support rods, which are secured to the building's structural components above the finished ceiling, hang downward so that their ends project into holes drilled into the finished ceiling at pre-defined support locations. In this manner, the finished ceiling does not bear the weight of the fixtures, but rather the weight of the fixtures is taken up by the overhead support rods. What is seen at the finished ceiling are junctions between the cable attachment hardware and the hidden support rods.

A problem with such ceiling junctions is that the junctions are often unsightly. They can also damage the surrounding ceiling material. For example, a hole may be drilled in the ceiling material having visible ragged edges, or the ceiling material, which may be a relatively soft material such as acoustical tile, may be torn, abraded, or crushed around the junction during the installation process or when a pendulum motion is imparted to the suspended fixture components. Furthermore, the holes that need to be drilled through the finished ceiling to accommodate the junctions are frequently slightly mislocated such that the junctions tear the ceiling material when the suspension cables and rods, under the weight of the fixtures, tend to align themselves.

The present invention overcomes the problem of providing aesthetically pleasing ceilings junctions for suspended architectural lighting fixtures by providing a self-tapping sleeve that permits a suspension junction in the finished ceiling to be created that has a pleasing finished appearance. The self-tapping sleeve of the invention is easy to properly position and install and will act to protect adjacent ceiling material from possible damage in the event the suspension hardware is caused to move in sideward motion, for example, during an earthquake or when a workman jostles the lighting fixtures during installation or relamping.

SUMMARY OF THE INVENTION

Briefly, the invention is a self-tapping sleeve comprised of a cylindrical body having a cylindrical perimeter surface and opposed perimeter cutting elements projecting upwardly from the top end of the cylindrical body for producing a circular cutting action in a tapable material of a finished ceiling when the cylindrical body of the sleeve is rotated in an advance rotation. A central passageway extends through the sleeve's cylindrical body for receiving the junction hardware for the suspended lighting fixture, and thread means are provided on the perimeter surface of the body for advancing the sleeve into the tapable material when the sleeve is rotated and for holding the sleeve in place once it is installed. Preferably, the bottom end of the sleeve is provided with a trim ring for trimming out the junction by covering the interface between the sleeve body and the ceiling material.

In the preferred embodiment there are two opposed perimeter cutting elements having active cutting faces, each of which faces the direction of advance rotation of the sleeve. These active cutting faces preferably taper upwardly such that the uppermost portion of the cutting elements form cutting points that lie on the perimeter of the cylindrical body. To reduce the tendency of the cutting points to "walk" along the ceiling surface when the tapping rotation is initiated, the active cutting surfaces preferably are made to lie in substantially parallel planes that are offset to either side of the sleeve's axis of rotation, rather than being aligned on the same radial. Such an offset design will facilitate proper positioning of the sleeve.

In one aspect of the invention, the center passageway of the sleeve's cylindrical body is provided with a key-shaped portion for receiving a key-shaped end of a drive tool, such as a power drill. Preferably, the key-shaped portion of the center passageway, suitable a hexagonal-shaped opening, is formed at the very top end of the body with the remainder of the center passageway forming a bottom cavity portion which presents a larger opening than the key-shaped top end of the passageway. The bottom cavity portion of the passageway can suitably present a cylindrically-shaped opening for receiving a cylindrical cable retainer part when the cable retainer part is screwed onto the free end of a threaded support rod as hereinafter described.

In a further aspect of the invention, the thread structure on the perimeter surface of the sleeve's cylindrical body is a helical thread structure that allows for substantial portions of unthreaded perimeter surface between adjacent threads. The resulting space between threads will permit the sleeve to be inserted into softer material, such as mineral board, plaster board, and fiberglass ceiling tiles, without excessively disturbing the material and causing it to break up or tear. Yet, once inserted, the threads will prevent the sleeve from being pulled back out of the finished ceiling.

While invention is described herein as being used in ceiling materials for the suspension of architectural lighting fixtures, it is understood that the self-tapping sleeve of the invention can be used in any application involving a ceiling or wall material capable of being tapped into where a finished junction or passage through the ceiling or wall material is desired.

Therefore, it can be seen that a primary object of the invention is to provide a self-tapping sleeve which will tap through a finished drop ceiling to permit access to overhead structural components of a building. It is a further object of the invention to provide a self-tapping sleeve which is easy to install using a handheld drive tool, and which will resist the tendency to wander off or "walk" the desired tapping location when the sleeve begins to penetrate the ceiling material. It is still a further object of the invention to provide a self-tapping sleeve which will tap into the ceiling material while disturbing as little of the ceiling material as possible and which will provide a clean and finished look at the ceiling junction. Still other objects of the invention will be apparent from the following specification and claims.

DESCRIPTION OF THE DRAWINGS

FIG. 1 is a bottom perspective view of a lighting fixture suspended below a grid ceiling and showing a ceiling junction using a self-tapping sleeve in accordance with the present invention.

FIG. 2 is an enlarged cross-sectional view in side elevation of the ceiling junction as shown in FIG. 1, showing a cross-section of the self-tapping sleeve of the invention taken along lines 2—2 of FIG. 3.

FIG. 3 is a top plan view of a self-tapping sleeve in accordance with the present invention.

FIG. 4 is a front elevational view thereof, showing the location of the leading edge and trailing edge of the thread structure of the sleeve.

FIG. 5 is a rear elevational view thereof.

FIG. 6 is a bottom plan view thereof.

FIG. 7 is a right side elevational view thereof.

FIG. 8 shows a power drill having a hexagonal bit.

FIG. 9 shows a handled "Allen" head screwdriver with hexagonal end.

DETAILED DESCRIPTION OF THE ILLUSTRATED EMBODIMENT

Referring now to the drawings, FIGS. 1 and 2 show one of the ceiling junctions 12 for a lighting fixture 14 which is suspended below grid ceiling 16 by means of suspension cables such as suspension cable 18. The illustrated suspension cable attaches to the end of a threaded support rod 20—typically a ¼-20 threaded rod—which is located above the grid ceiling and anchored to one or more of the building's overhead structural members (not shown). This attachment is accomplished by means of an internally threaded cable retainer part 24 rotatably secured to the end of suspension cable 18. The rotatable retainer part screws onto the end of the support rod from below the grid ceiling 16 to form a junction that penetrates ceiling tile 16a. This junction is captured, and the surrounding ceiling tile is protected by, the self-tapping sleeve 10 of the present invention described below. While the sleeve is illustrated as capturing the junction between a support rod and cable retainer part, it will be appreciated that the cable could be made to run entirely through the sleeve for attachment above the grid ceiling.

Referring to FIGS. 3–7, the self-tapping sleeve of the invention is seen to include a cylindrical body 11 having a top end 11a, bottom end 11b, and a center passageway 13 which extends entirely through the body from its top end to its bottom end. Thread means in the form of a continuous helical thread structure 17 are additionally formed on the body's cylindrical perimeter surface 25. As best seen in FIGS. 4, 5 and 7, the helical thread structure provides adjacent threads separated by a straight portion of the body's perimeter surface, such as adjacent threads 17a, 17b and the intermediate perimeter surface portion 25a shown in FIG. 4.

The sleeve is provided with forward cutting elements in the form of two perimeter cutting elements 15 having cutting points 15a projecting upwardly from the body's top end 11a. The cutting elements are disposed in opposed relation about the center passageway 13 such that they produce a circular cutting action in front of the sleeve such that the sleeve cuts through the ceiling tile 16a when the cylindrical body of the sleeve is rotated in an advanced rotation as hereinafter described. While the cylindrical body is described herein as having two opposed cutting elements, it will be understood that it may be possible to provide three or more cutting elements distributed around the center passageway for producing a similar circular cutting action.

An annular trim ring 19 is also preferably provided at the body's bottom end 11b. When the sleeve is fully installed in a ceiling tile as shown in FIGS. 1 and 2, the annular trim ring 19 will act to enhance the finished look of the ceiling junction. The trim ring will also prevent the sleeve from advancing too far into the ceiling tile during the installation process, that is, it will permit the cylindrical body of the sleeve to advance only to a point where its bottom end is flush with the bottom surface of ceiling tile 16a.

As best illustrated in FIG. 2, the passageway 13, which provides the passageway through the ceiling tile for the junction formed by threaded support rod 20 and cable retainer part 24, is divided into two portions, a top end portion 21 and a bottom cavity portion 23. The top end portion has a key-shape, and suitably a hexagonal shape, for receiving a key-shaped end of a drive tool. Suitable drive tools are shown in FIG. 8, which shows a power drill (A) having a hexagonal-shaped bit (B), and FIG. 9 which shows a handheld "Allen" head screwdriver (C) with hexagonal end (D).

The bottom cavity portion 23 of passageway 13 is seen to be a cylindrical cavity that presents a larger opening than the passageway's key-shaped top end portion 21. This bottom cavity portion is suitably sized to receive the cylindrical cable retainer part 24 such that the cable retainer part, when installed, is recessed into the bottom end 11b of the sleeve as shown in FIG. 2. It also preferably extends into the cylindrical body for a substantial portion of the length of the body, and accounts for most of the center passageway. It is noted that the radial dimension of bottom cavity portion 23 and retainer part 24 is substantially larger than the radial dimension of key shaped top end portion 21 and the ends (B) and (D) of drive tools (A) and (C). The reduced size of the passageway at the body's top end provides greater wall thicknesses for the perimeter cutting elements described below.

The construction of the sleeve's perimeter cutting elements 15 and thread structure 17 will now be described in more detail. Each of the cutting elements 15 has an active cutting face 29 defined by an interior base edge 31 at the base portion of the cutting elements, an outer outside edge 33, and a medial edge 35. As best seen in FIGS. 4 and 5, cutting points 15a are formed at the uppermost portion of the cutting elements by the intersection of the outside and medial edges of the active cutting faces. Each of the cutting faces face the direction of advance rotation of the sleeve— denoted by arrow (W) in FIGS. 3 and 6—and each of the cutting elements has a sloped trailing surface 37 that wraps around the perimeter of the top end of the sleeve's body to intersect the interior base edge 31 of the opposed cutting element. As best seen in FIG. 7, the cutting elements' outside perimeter surfaces 27 conform to and are integral with the outside perimeter surface 25 of the sleeve's body to provide a smooth transition between the cutting elements and the thread structure 17 as the sleeve advances into the ceiling material.

Referring to FIGS. 3 and 7, the active cutting faces 29 and cutting points 15a of opposed cutting elements 15 are preferably offset with respect to each other. More specifically, the cutting faces fall in substantially parallel planes that are offset to opposite sides of the axis of rotation (R) such that their respective cutting points 15a fall on radial line (L'), with the radial line (L') preferably being rotational offset by an offset angle (P) of approximately 20° with respect to a radial line (L) that extends through the axis of rotation (R) in parallel relation to the active cutting faces. It is found that such an offset relation will inhibit the tendency of the sleeve to skip or walk along the surface of the ceiling tile when the installation of the sleeve is initiated.

It can be seen that cutting points 15a result from the intersection of the following four surfaces forming the cutting elements 15: the active cutting face 29, the outside perimeter surface 25, the sloped trailing surface 37, and an inside face 39 which extends between the active cutting face and the trailing surface. To provide a suitable circular cutting action at the perimeter of the sleeve, the intersection of the outside and medial edges of the active cutting face is suitably approximately 30° and the slope of the trailing surfaces at the back of the cutting points, as defined by the angle between outside edge 33 and trailing edge 38, is suitably approximately 45°.

As above-mentioned, the helical thread structure acts to advance the sleeve into the ceiling tile 16a and to prevent the sleeve from pulling out of the ceiling tile once it is installed. A suitable design for the thread structure is important to allow the thread to advance through the ceiling material without damaging or breaking up the material. As also above-mentioned, one important feature of the thread structure for achieving this objective is to space out the thread such that there is a flat cylindrical, unthreaded surface, such as a surface denoted by numeral 25a in FIG. 4, between adjacent threads. However, it is also desirable to design the thread structure so that the thread leads into the ceiling material in an optimum manner.

More specifically, the thread structure has an upper leading edge 41 and a bottom trailing edge 42, and top and bottom surfaces 43, 45. Preferably, the leading edge of the helical thread structure has a graduated beginning and commences proximate to and just behind the active cutting face of one of the cutting elements. As best seen in FIG. 7, the thread structure's leading edge 41 suitably commences just below and approximately 20° rotationally behind the forward cutting element 15. By situating the leading edge of the thread behind the active cutting face, the cutting face will have an opportunity to remove material before the thread engages the ceiling tile.

The thread structure spirals around the perimeter surface of the cylindrical body 11 for a substantial portion, but preferably not all of its length. It is advantageous to terminate the thread structure short of the bottom end of the body so as to leave an unthreaded gap 44 between the trim ring 19 and the trailing edge of the thread, suitably a gap of at least 3/16 inches. Such a gap will eliminate any auger-like action at the bottom end of the sleeve when it is overly tightened, thus reducing the possibility that the ceiling material at the junction will be disturbed. Also, to provide for a suitable advance of the sleeve into the ceiling material and for suitable retention of the sleeve in the ceiling, the thread structure preferably has a pitch or angle of attack of approximately 10 degrees, and top and bottom surfaces 43, 45 having differential slopes of approximately 35° and 25°, respectively. It is seen that the top and bottom surfaces intersect to give the thread structure a knife edge 47 that lies on a somewhat larger diameter than the diameter passing through the cutting points 15a. Thus, the knife edge of the thread structure will cut through adjacent ceiling material as the sleeve is rotated into the ceiling.

To use a selftapping sleeve in accordance with the invention, the suspension points for the lighting fixture are first located and marked on the finished ceiling to determine where self-tapping sleeves in accordance with the invention will be installed. The sleeves are then installed one at a time by placing a sleeve 10 over the key-shaped end of a drive tool, such as the hexagonal bit (B) of power drill (A) shown in FIG. 8, and driving the sleeve into the ceiling tile at the marked suspension location, with the ceiling tile either removed or held in place. Insertion of the sleeve is initiated with the cutting points 15a placed against the ceiling tile. The sleeve will quickly be drawn into the ceiling material until the trim ring reaches the bottom surface of the ceiling, whereupon the power tool is deactivated and withdrawn from the sleeve.

Once the sleeve is installed, the junction 12 between the support rod 20 and cable retainer 24 are made by dropping the support rod down through keyed top end portion 21 of the sleeve center passageway 13 of the sleeve and screwing the cable retainer onto the bottom tip of the support rod from the sleeve's bottom end. (It is noted that the support rod should be installed such that it's bottom tip projects into the bottom cavity portion 23 of the center passageway.)

The sleeve preferably is fabricated of a durable material, suitably a polycarbonate plastic, such that it will tap into a variety of ceiling materials having different hardness characteristics ranging from sheetrock to acoustical tile.

Therefore, it is seen that the present invention provides an easily installed, self-tapping sleeve that provides a finished aesthetically pleasing ceiling junction for a suspending lighting fixture. While the present invention has been described in considerable detail in the foregoing specification and claims, it is understood it is not intended that the invention be limited to such detail, except as is necessitated by the following claims.

What I claim is:

1. A self-tapping sleeve for insertion into a tapable material comprising a cylindrical body having an cylindrical perimeter surface and a defined axis of rotation, and further having a bottom end, a top end, and a passageway extending along said axis of rotation through said body between the bottom and top ends thereof, two upwardly projecting perimeter cutting elements at the top end of said body for producing a circular cutting action into a tapable material when the cylindrical body of the sleeve is rotated in an advance rotation, each of said cutting elements having an active cutting face which faces the direction of advance rotation of the sleeve and which tapers upwardly to a cutting point, said cutting faces lying in substantially parallel axially extending planes offset to opposite sides of the axis of rotation of said cylindrical body, and a helical thread structure on the perimeter surface of said body for advancing the sleeve into a tapable material upon advance rotation of the sleeve.

2. The self-tapping sleeve of claim 1 wherein said cutting points fall on a radial line through the axis of rotation of said body which has an angular offset of approximately 20 degrees in respect to a center line which passes through said axis of rotation in substantially parallel relation to said cutting faces.

3. The self-tapping sleeve of claim 1 wherein said helical thread has an upper leading edge and bottom trailing edge and wherein said upper leading edge commences proximate to the cutting face of one of said cutting elements.

4. The self-tapping sleeve of claim 3 wherein said leading edge commences proximate to and behind the cutting face of one of said cutting elements.

5. The self-tapping sleeve of claim 4 wherein said leading edge commences at approximately 20 degrees of rotation behind one of said cutting faces.

6. The self-tapping sleeve of claim 4 wherein an unthreaded gap is provided between the trailing edge of said helical thread and the bottom end of said cylindrical body.

7. The self-tapping sleeve of claim 1 wherein the cutting face of each of said cutting elements has a outside edge and a medial edge, and wherein the cutting face intersects with the perimeter surface of said cylindrical body at the said outside edge and the medial edge intersects the outside edge at an approximately 30 degree angle to form said cutting point.

8. The self-tapping sleeve of claim 1 wherein the cutting face of each of said cutting elements has a outside edge and a medial edge, and wherein each of said cutting elements has an outside perimeter surface trailing said outside edge, the outside perimeter surfaces of said cutting elements conforming to and being integral with the perimeter surface of said cylindrical body.

9. A self-tapping sleeve for insertion into a tapable material comprising a cylindrical body having a cylindrical perimeter surface, a defined axis of rotation a bottom end, a top end, and a center passageway extending through said body between the bottom and top ends thereof, said center passageway being centered about said axis of rotation including a key shaped top end portion at the top end of said body for receiving a correspondingly key shaped end of a drive tool, and further including a bottom cavity portion in the bottom end of said body, the bottom cavity portion of said passageway presenting a larger opening than the top end portion thereof for receiving a part that has a larger radial dimension than a drive tool received by said top end portion, two upwardly projecting perimeter cutting elements at the top end of said body, said cutting elements, each having an active cutting face which faces the direction of advance rotation of the sleeve, said cutting faces laying in planes that extend in substantially parallel relation to the axis of rotation of said cylindrical body, said cutting faces being disposed in opposed relation about the key shaped top end portion of said center passageway for producing a circular cutting action into a tapable material when the cylindrical body of the sleeve is rotated in an advance rotation, thread means on the perimeter surface of said body for advancing the sleeve into a tapable material upon advance rotation of the sleeve, and a trim ring projecting from the bottom end of said body.

10. The self-tapping sleeve of claim 9 wherein the key shape of the top end portion of said passageway is a hexagonal shape.

11. The self-tapping sleeve of claim 9 wherein the bottom cavity portion of said center passageway extends from the bottom end of the cylindrical body for most of the length thereof.

12. A self-tapping sleeve for insertion into a tapable material comprising a cylindrical body having an cylindrical perimeter surface and a defined axis of rotation, a bottom end, a top end, and a center passagement extending through said body between the bottom and top ends thereof, said center passageway including a key shaped top end portion at the top end of said body for receiving a correspondingly key shaped end of a drive tool, and further including a bottom cavity portion in the bottom end of said body, the bottom cavity portion of said passageway presenting a larger opening than the key shaped top end portion thereof for receiving a part that has a larger radial dimension than a drive tool received by said top end portion, two upwardly projecting perimeter cutting elements at the top end of said body for producing a circular cutting action into a tapable material when the cylindrical body of the sleeve is rotated in an advance rotation, each of said cutting elements having an active cutting face which faces the direction of advance rotation of the sleeve and which tapers upwardly to a cutting point, said cutting faces lying in substantially parallel, axially extending planes offset to opposite sides of the axis of rotation of said cylindrical body, a continuous helical thread structure on the perimeter surface of said body for advancing the sleeve into a tapable material upon advance rotation of the cable sleeve, said thread structure producing axially adjacent threads separated by axially straight perimeter surface portions of said cylindrical body and having an upper leading edge and bottom trailing edge, said upper leading edge commencing proximate to and behind the cutting face of one of said cutting elements, and an annular trim ring projecting from the bottom end of said body.

* * * * *